United States Patent Office 3,419,379
Patented Dec. 31, 1968

3,419,379
PROCESS FOR COATING FERTILIZER PARTI-
CLES WITH MAGNESIUM AND CALCIUM
PHOSPHATES AND SULFATES AND THE RE-
SULTING PRODUCT
Charles D. Goodale and John A. Frump, Terre Haute,
Ind., assignors to Commercial Solvents Corporation
No Drawing. Filed Sept. 18, 1964, Ser. No. 397,642
14 Claims. (Cl. 71—60)

ABSTRACT OF THE DISCLOSURE

A method of producing water-resistant, solid discrete fertilizer particles by separately coating the particles with an acidic inorganic material having dessicating properties, such as superphosphoric acid, $SO_3$, oleum and mixtures thereof, and an alkaline material such as calcium or magnesium compounds which react with the acid material to produce a salt in situ on the particles. Calcium and magnesium sulfates and phosphates are preferred. Coatings can also be provided from ammonia and sulfuric acid or $SO_3$ vapors. Variation of the amount of coating formed on the fetrilizer particles provides an anti-caking fertilizer or a slow release fertilizer.

---

This invention relates to the production of coated fertilizers and fertilizer materials, the coatings in thin films providing good storability characteristics and in thicker films controllably releasing plant nutrients. It is particularly concerned with a process for coating fertilizer materials with coating agents which are largely relatively water-insoluble or nonhygroscopic inorganic salts, formed in situ upon granules or particles of the fertilizer materials, and to the novel products thus obtained.

Plant nutrients can be classified as primary plant nutrients, secondary plant nutrients and micronutrients. Primary plant nutrients include N, P and K; secondary plant nutrients include Ca, Mg and S; and micronutrients include Cu, Zn, B, Fe, Mn, and Mo. Fertilizer N is normally provided by ammonia, ammonium salts, e.g., ammonium nitrate, or urea; P by phosphoric acid, ammonium phosphates and superphosphates; K by potassium magnesium sulfate, potassium chloride, potassium nitrate and potassium sulfate; Ca by CaO or calcareous limestone; Mg by dolomitic limestone as well as potassium magnesium sulfate; S by elemental sulfur, gypsum as well as potassium magnesium sulfate and potassium sulfate; Cu by copper sulfate; Zn by zinc sulfate; B by sodium borate; Fe by iron sulfate; Mn by manganese sulfate; and Mo by sodium molybdate. These and other fertilizer materials for providing plant nutrients are also contemplated for use in connection with the present invention and the term "fertilizer" as used in this description and the appended claims is intended to encompass such materials individually as well as in any combination thereof adapted to serve as a plant nutrient.

One of the serious problems confronting the fertilizer industry involves the efficient provision of plant nutrients in proper amounts and ratios at the time the plants require the various nutrients. Soluble nutrients in excessive amounts at a given time can result in the burning of the plant and thus can be even more deleterious to the plant than the use of insufficient amounts of nutrients. Also soluble nutrients may become unavailable to the plant due to leaching from the root zone or to chemical reactions with other soil constituents to form insoluble compounds. A particularly important factor affecting the efficiency of providing plant nutrients resides in the number of applications required to make the nutrients available to the plant at the time the plant can utilize them. A particularly inefficient manner of making the nutrients so available requires the making of such applications periodically during the growing season—obviously this method not only does not give a steady supply of nutrients to the plant but also it is costly in the amount of labor required.

Proposed solutions for the efficient provision of nitrogen to plants involve the use of nitrifying inhibitors in combination with ammonium compounds and the use of ureaformaldehyde resins which decompose over a relatively long period and release N during decomposition. Encapsulation of single or multi-nutrient fertilizers in various types of slowly permeable organic films has been suggested. Another proposed solution involves the chelation of various nutrients with chelating agents which will release the nutrients over a period of time. These proposed solutions are relatively expensive and in some cases are limited as to the scope of nutrients which can be provided.

The objects of the present invention include the provision of coated solid fertilizers and fertilizer materials which: will have good storage characteristics and lower free-water contents than the uncoated materials; with thick coating films will controllably release plant nutrients slowly to make such nutrients available when required by the plants; will flow freely and not tend to cake or set; are relatively inexpensive in comparison with other anti-caking or slow-release nutrient materials; can be uniformly distributed at the site of fertilization; will not damage plants, e.g., by providing an excessive amount of the plant nutrient which either burns the plant or affects it by the so-called salt effect, i.e., deleteriously affecting the plant metabolism; will be characterized by good fertilizer efficiency resulting in lower application costs and more efficient promotion of plant growth; and which even with relatively thin coating films, will have improved, anti-caking, flowability, storage and handling characteristics. The coatings of this invention are more effective as anti-caking agents than the widely used inorganic coating agents such as clay and diatomaceous earth. This invention is directed to fertilizers and fertilizer materials including granules and prills containing simple as well as mixed plant nutrients including secondary and micronutrients.

In accordance with the objects of the present invention, solid fertilizers and fertilizer materials, preferably in granular form, are coated with new and improved coatings having a desiccating action as they are produced or formed in situ on the solid fertilizer by the reaction of inorganic acids having desiccating properties and inorganic alkaline materials. The coatings are excellent anticaking agents, relatively inert and water-insoluble and in thick films can strongly contain plant nutrients, thus providing a controlled rate of release of plant nutrients. Representative of the new and improved coatings of this invention which provide a desiccating action as they are formed in situ are inorganic phosphates such as calcium phosphates, especially dicalcium phosphate, magnesium phosphates and inorganic sulfates such as calcium and magnesium sulfates, alone or in mixtures. Additionally, it is within the scope of this invention to provide a process for producing improved solid fertilizers coated with less water-insoluble agents such as ammonium sulfate, ammonium phosphates and the like.

The process of the present invention for forming the water-resistant coatings which comprise Ca and Mg phosphates and their mixtures and/or sulfates on the fertilizer granules or particles generally comprises first coating the fertilizer granules or particles with a sulfate or phosphate-yielding acidic material having desiccating properties and then neutralizing the acidic material with an alkaline material to form the desired coating agent in situ upon the fertilizer, the coating agent preferably also providing a desiccating action by taking up water of crystallization. For instance, a coating of predominately dicalcium phosphate can be applied by first coating the fertilizer with superphosphoric acid or phosphorus pentoxide and then tumbling the fertilizer in controlled amounts of powdered calcium oxide or carbonate. Magnesium carbonate and/or oxide can replace part or all of the calcium oxide or carbonate if desired. Also a calcium sulfate coating can be formed by separately coating with $SO_3$ or orleum and then calcium and/or magnesium oxide and/or carbonate. The liquid acidic materials can be distributed uniformly over the fertilizer granules by conventional means such as spraying, agitating, tumbling, rolling and the like.

The use of water-absorbing superphosphoric acid and sulfuric anhydride or oleum is particularly advantageous since coatings formed from these materials tend to further dry the fertilizer materials as the coatings are formed, especially since the dicalcium and/or magnesium phosphate and the calcium and/or magnesium sulfate coatings tend to take on water of crystallization. Finely ground phosphate rock can be used to replace some of the rather expensive superphosphoric acid in the calcium and/or magnesium phosphate coatings. Other modifications such as magnesium ammonium phosphate, superphosphoric acid reduced to about 102% $H_3PO_4$ equivalent and the use of mixtures of superphosphoric acid and oleum, can also be used, the two latter modifications being especially designed to give a more rapid reaction with (dolomitic) limestone or phosphate rock. Heavy or multiple coatings, with one or more of the coatings described above, will give a substantial degree of controlled release of soluble plant food from a fertilizer granule or particle. However, a supplemental coating with a water-resisting material such as petroleum wax will further slow down the rate of release.

While the exact amount of coating agent to be used will depend upon such variables as the specific agent to be applied, the specific fertilizer material to be coated, the use to be made of the product, whether or not a controlled rate of release is desired, the conditions under which the product will be stored, etc., it has been found that good results as anticaking agents are obtained when the amount of coating agent employed is as little as 0.75 percent by weight based upon the fertilizer, or, for controlled release of plant nutrients, as much as 5 to 25 percent or more of the coating agent can be added. The preferred amount of the coating agent when used solely for anticaking purposes is from about 1 to 2 percent, and up to about 10 to 25 percent, by weight based on the fertilizer, when controlled nutrient release is desired.

A modification of the process which can be used for the application of an improved anticaking coating of ammonium sulfate, for example, comprises passing fertilizer granules through an atmosphere containing sulfur trioxide, and water vapor if needed, to first deposit a thin continuous coating of sulfuric acid around each granule. This acid is then immediately neutralized by passing the granule through a zone containing ammonia vapors to form a coating of ammonium sulfate. A coating of moisture resistant calcium sulfate can also be evenly applied around each granule or particle by this modified procedure by dusting the granules with calcium and/or magnesium oxide or carbonate after they have had a film of sulfuric acid applied to the surface thereof by the procedure described above.

Alternately, according to this modified procedure the fertilizer granules or particles containing ammonia-soluble materials such as ammonium nitrate or urea can first be passed through an atmosphere of ammonia, and water vapor if needed, to form a thin coating of a solution of these ammonia-soluble materials over the entire surface of each granule which solution can then be neutralized by passage of the granules immediately into another zone in which a sufficient amount of sulfur trioxide has been volatilized or sublimed to react with the free ammonia on the surface of the particle, thus coating it with a thin film of ammonium sulfate or the particles or granules may be tumbled in an appropriate amount of superphosphoric acid or oleum.

The modified procedures utilizing vaporized materials and their various modifications, are best performed by allowing the fertilizer granules to fall through a current of air moving countercurrent to the granules and containing the required vapors so that the entire surface of each granule is exposed to the vapors and there is a minimum tendency for the granules to stick together. The amount of ammonia and sulfur trioxide vapors contained in the various zones is regulated so as to yield a substantially dry, neutral product. Little, if any, final drying will be required, but is may be desirable to lightly dust the granules with a mildly alkaline material such as finely ground limestone to ensure that all of the acid on the surface of the granules is neutralized.

Other inorganic coatings can be applied using this modified procedure by utilizing different acids, e.g., nitric acid, and then neutralizing the acid with an alkaline material which produces the desired coating. A thin film of potassium nitrate, which has good hygroscopic characteristics, can be formed around the granule by first depositing on it a thin film of nitric acid formed in a zone containing water vapor and a nitrogen oxide, followed by neutralization of the acid with potassium carbonate or potassium hydroxide. Potassium sulfate has excellent hygroscopic characteristics and can be formed using a basic potassium compound to neutralize a coating of sulfuric acid.

Multiple coatings of the same or different herein described materials can be applied to the fertilizer granules to insure complete and even coverage thereof. Furthermore, two or more water-resistant coatings having different solubilities and porosities can be used to provide a slow- or controlled-release fertilizer, e.g., one which slowly releases plant nutrients over a period of time at the desired rate.

In the present invention it is highly desirable that the acidic material take up free water from the fertilizer being coated. If only anticaking and good storage characteristics are desired the salt coating can be relatively light, say 1 to 2 percent by weight of the fertilizer. Also in this case the coating need be only non-hygroscopic and stable but not relatively water-insoluble—for example, it could be ammonium sulfate or an ammonium phosphate made as described above.

If greatly increased moisture resistance, and especially if controlled release of plant nutrients is desired, the salt coating should be applied in much thicker and preferably in multiple coatings, amounting to 5 to 25 percent by weight of the fertilizer, and it should be very slowly soluble in water. Preferably the salts formed into these coatings should take up water of crystallization so as to continue to remove any free water present in the fertilizer. Salt coatings having this latter characteristic have been described above and are an essential part of this invention.

Lighter weight coatings as described above can be used if covered by a hard fat, wax or even a plastic type top coating to seal off any imperfections in the inorganic coating. There can be some objections to the use of an organic top coating on ammonium nitrate but this objection would not apply to coatings on other fertilizers.

When controlled release, rather than just slow release, is desired in such fertilizers, provision can be made for regulating the rate at which the fertilizer nutrients would be released in a warm, moist soil. This rate of release can be controlled to a considerable extent by the weight and type of coating used, the number of coatings used, size of granules, and the supplemental coating with a water-resistant wax-like or plastic material. The rate of release can be further delayed by incorporating some bactericidal and fungicidal agents, e.g., hexamethylene tetramine, propionates, benzoates and copper sulfate, in the organic coating. (The bactericidal and/or fungicidal agent selected should be one which has the desired rate of decay or solubility in the soil which would offer a further means of controlling the rate of release.) An example of such a final controlled-release fertilizer includes a mixture of 10% by weight of granules having a fairly rapid rate of release or availability, 20% with a somewhat more delayed rate of availability, etc., so that the fertilizer nutrients are released at various times and especially at the time of the crop's major requirements for the plant nutrients. If, as is frequently the case, the crop being grown requires various amounts of the several plant nutrients at different times during its growth, the percentage of plant foods in the coated fertilizer fractions—which as mentioned above will be released at various times throughout the growth period—should be varied so as to approximate the requirements of the crop at all times for each specific nutrient.

The following examples will serve to illustrate this invention without limiting it.

EXAMPLE I

To illustrate the desiccating properties of the coatings described above, the chemical reactions involved and the evaluation of water absorption with a dicalcium phosphate coating are as follows:

Reactions:

(1) 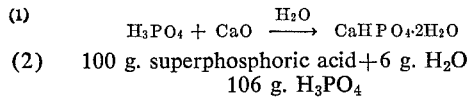
$$H_3PO_4 + CaO \xrightarrow{H_2O} CaHPO_4 \cdot 2H_2O$$

(2) 100 g. superphosphoric acid + 6 g. $H_2O =$ 106 g. $H_3PO_4$

Formula weights:

| | |
|---|---|
| $H_3PO_4$ | 98 |
| CaO | 56.08 |
| $H_2O$ | 18 |
| $CaHPO_4 \cdot 2H_2O$ | 172.1 |

Accordingly, 98/172.1 or 56.8% of the coating is from $H_3PO_4$ and 6/106 or 5.66% of 56.8% or 3.2% by wt. of the coating is from water absorbent in converting superphosphoric acid to $H_3PO_4$. Additionally, only one of the two mols of water of crystallization in the $CaHPO_4 \cdot 2H_2O$ coating is formed during reaction and the second mol is from free water present in the fertilizer being coated. Accordingly, 18/172.1 or 10.5% by weight of the coating is from free water absorbed from the fertilizer.

Therefore, 10.5% plus 3.2%, i.e., 13.7% by weight of the coating consists of free water taken up by superphosphoric acid to form $H_3PO_4$ and as water of crystallization by the coating.

(1) With an anticaking coating comprising 2% by weight $CaHPO_4 \cdot 2H_2O$ applied to a fertilizer, 13.7% of 2% or 0.27% by weight water is removed from the fertilizer. This amount of water-removal is very significant in the case of highly hygroscopic fertilizers such as those containing high percentages of ammonium nitrate or urea, which must be dried (and are difficult to dry) to a low moisture content in order to obtain satisfactory storage characteristics. Ammonium nitrate is normally dried to about 0.3 to 0.4% moisture and at this level is subject to deterioration due to crystal reversion with temperature changes through the critical temperature levels, especially the crystal reversion point of 89.8° F. It is known that crystal-reversion deterioration of ammonium nitrate prills and granules is greatly reduced when its moisture content is reduced, especially when it is reduced below about 0.1%. Excluding other moisture from the system, such a moisture level is readily obtained by applying 2% of the above described coating to ammonium nitrate which initially had a moisture content of approximately 0.35%. With this 2% coating and with the low moisture content achieved with the aid of this coating, the ammonium nitrate can contain over 34% N. With the conventional coating agents and normal moisture contents it generally contains between 33.5% and 34.0% N.

(2) With a controlled release coating—comprising, e.g., a 10%–25% by weight coating, based on the weight of the fertilizer—used to obtain controlled-release of plant nutrients, the moisture-reducing potential of the coating is significant on practically all fertilizers and fertilizer materials. A 10% $CaHPO_4 \cdot 2H_2O$ coating has the potential of removing 1.37% water from the fertilizer system and a 25% coating can remove 3.4%. The nutrient content of the fertilizer would be reduced proportionately but the coatings contribute 4.12% and 10.3%, respectively, of available $P_2O_5$ to the nutrient content of the coated fertilizer.

The foregoing comments apply when the phosphoric acid coating is neutralized with $CaCO_3$ instead of CaO. However, the reaction is not as rapid and $CO_2$ is evolved.

EXAMPLE II

To illustrate the effectiveness of a magnesium phosphate coating, the reactions and evaluation of water absorption are as follows:

Reactions:

(1) 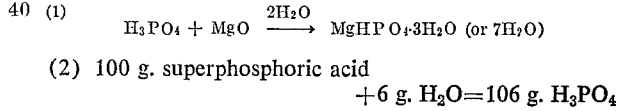
$$H_3PO_4 + MgO \xrightarrow{2H_2O} MgHPO_4 \cdot 3H_2O \text{ (or } 7H_2O)$$

(2) 100 g. superphosphoric acid
+6 g. $H_2O = 106$ g. $H_3PO_4$

Formula weights:

| | |
|---|---|
| $H_3PO_4$ | —98 |
| MgO | —40.32 |
| $MgHPO_4 \cdot 3H_2O$ | —174.36 |

Accordingly, 98/174.36 or 56.3% of the coating is from $H_3PO_4$ and 6/106 or 5.66% of 56.2% or 3.2% by weight of the coating weight is water absorbed in converting superphosphoric acid to $H_3PO_4$. Additionally, since two mols of the water are from the fertilizer being coated, 36/174.36 or 20.6% by weight of the coating consists of free water taken up from the fertilizer.

Therefore, 20.6% plus 3.2%, i.e., 23.8% by weight of the $MgHPO_4 \cdot 3H_2O$ coating consists of free water taken up from fertilizer by coating.

Since dimagnesium phosphate may contain up to 7 mols water of crystallization, the actual water-removing potential of this coating is much greater than shown in the above calculations. Also any tribasic magnesium phosphate formed can contain up to 8 mols water of crystallization.

(1) With an anticaking coating comprising 2% by weight $MgHPO_4 \cdot 3H_2O$, 23.8% of 2% or 0.476% by weight water is removed from the fertilizer. This amount of water-removal is significant in the case of highly hygroscopic fertilizers as discussed in Example I(1).

(2) With 10% and 25% coating, the water-removing potentials of the coatings are 2.38% and 5.95%, respectively, based on the weight of the coated fertilizer. This amount of water removal from any type of fertilizer is very significant.

EXAMPLE III

To illustrate the effectiveness of a calcium sulfate coating, the reactions and evaluations of water absorption are as follows:

The sulfuric acid anhydride, i.e., $SO_3$, can be used as such or in the form of oleum.

Reactions:

(1) $$SO_3 + H_2O \rightarrow H_2SO_4$$

(2) $$H_2SO_4 + CaO \xrightarrow{H_2O} CaSO_4 \cdot 2H_2O$$

Formula weights:

| | |
|---|---|
| $SO_3$ | —80.06 |
| $H_2O$ | —18.02 |
| $H_2SO_4$ | —98.08 |
| $CaO$ | —56.08 |
| $CaSO_4 \cdot 2H_2O$ | —172.17 |

Accordingly, 98/172.2 or 57% by weight of the coating is from $H_2SO_4$ and 18/98.1 or 18.4% of 57%, i.e., 10.5% by weight of the coating represents water absorbed in converting $SO_3$ to $H_2SO_4$. Since one mol of the free water is taken from the fertilizer, 18%172.2 or 10.5% by weight of the coating is from free water absorbed from the fertilizer and combined in the coating as water of crystallization.

Therefore, 10.5% plus 10.5%, i.e., 21% by weight of the coating is due to absorbed water.

With an anticaking coating comprising 2%

$$CaSO_4 \cdot 2H_2O$$

21% of 2% or 0.42% water can be removed from the fertilizer whereas with a slow-release coating comprising 10% $CaSO_4 \cdot 2H_2O$, 2.1% water can be removed from the fertilizer. A 25% $CaSO_4 \cdot 2H_2O$ coating has the potential of removing 5.25% water from fertilizer.

EXAMPLE IV

The coatings listed in Table I are effective as coatings for fertilizer and have the potential of removing water from the fertilizer as given in Table I. Table I includes the coatings of Examples I, II and III for comparison. The three additional coatings of this example, being relatively water soluble, are largely to be used only at approximately 2% by weight for anticaking purposes.

TABLE II.—CALCIUM PHOSPHATE COATED HI-D

| Example | V | VI | VII | VIII |
|---|---|---|---|---|
| HI-D (uncoated, product size) (gms.) | 500 | 500 | 500 | 500 |
| Superphosphoric acid (gms.) | 2.5 | 5.0 | 12.5 | 22.5 |
| Calcium carbonate (powdered) (gms.) | 4.3 | 8.7 | 21.7 | 39.1 |
| Weight percent $Ca_3(PO_4)_2$ based on ammonium nitrate | 0.83 | 1.66 | 4.15 | 7.50 |

TABLE III

[Accelerated Caking Tests on $Ca_3(PO_4)_2$ Coated HI-D]

| Example | V | VI | VII | VIII | (1) |
|---|---|---|---|---|---|
| Break Point,[2] p.s.i.g. | 100 | 30 | 17 | 0 | 34 |

[1] Regular product, 2.8% Dicalite coating.
[2] If the material cakes, it is the pressure at which it will crumble; the lower the pressure at which it will crumble, the less caking tendency the material possesses.

For comparison, five commercial clay-type coating agents were evaluated in bridging tests as coating agents for ammonium nitrate. None of these coatings were as good as regular high-density ammonium nitrate product (2.8% Dicalite, see Table III) when subjected to the bridging tests evaluation.

Moisture pick-up test

The samples were placed in a high humidity atmosphere for 24 hrs. This qualitative hygroscopicity test showed that the more calcium phosphate coating applied the better the sample in resisting moisture pick-up. Under these conditions the control, uncoated ammonium nitrate, became entirely liquified, while the coated samples retained their original shape and appeared to pick up little or no moisture.

Particles of the calcium phosphate-coated ammonium nitrate were dropped into a beaker of water, and after a few minutes ammonium nitrate was leached out leaving a shell of calcium phosphate.

In Examples V–VIII approximately 10% excess Ca was used, assuming complete conversion of $H_3PO_4$ to $Ca_3(PO_4)_2$ according to the equation:

$$2H_3PO_4 + 3CaCO_3 \rightarrow Ca_3(PO_4)_2 + 3CO_2 + 3H_2O$$

EXAMPLE IX

Sample of ammonium nitrate were screened and the separate screen fractions used to reconstitute blends of a

TABLE I

| Name of Coating | Formula of Coating | Potential Free Water Removal from Fertilizer in percent by weight of Fertilizer | | | Solubility in 100 parts | | Melting Point, °C. |
|---|---|---|---|---|---|---|---|
| | | Coating 2% by wt. | Coating 10% by wt. | Coating 25% by wt. | Cold Water | Hot Water | |
| Dicalcium Phosphate (Example I) | $CaHPO_4 \cdot 2H_2O$ | 0.274 | 1.37 | 3.4 | 0.0224.5° | 0.075100° | Decomposes. |
| Magnesium Phosphate (Example II) | $MgHPO_4 \cdot 3H_2O$ | 0.476 | 2.38 | 5.95 | 0.31 | 0.20 | 100 ($-3H_2O$). |
| Calcium Sulfate (Example III) | $CaSO_4 \cdot 2H_2O$ | 0.42 | 2.1 | 5.25 | 0.22330° | 0.25750° | 128 ($-1\frac{1}{2}H_2O$). |
| Magnesium Sulfate | $MgSO_4 \cdot 7H_2O$ | 1.02 | 5.1 | 12.75 | 72.40° | 17840° | 70 (Decomposes). |
| Ammonium Sulfate | $(NH_4)_2SO_4$ | 0.273 | 1.365 | 3.4 | 70.60° | 103.3100° | 513 (Decomposes). |
| Monoammonium Phosphate | $(NH_4)_2PO_4$ | 0.096 | 0.48 | 1.2 | 22.70° | 173.2100° | |

EXAMPLES V–VIII

To illustrate the anticaking properties of calcium phosphate, a coating was applied as follows:

Superphosphoric acid (105% $H_3PO_4$, 76% $P_2O_5$) was added to 500 gms. of regular product size, high density, ammonium nitrate granules (HI-D) in a jar, the jar was sealed, and the mixture was rolled on a laboratory roller mill for 18 hrs. Finely powdered calcium carbonate was added to the ammonium nitrate-superphosphoric acid combination. The jar was sealed and placed on the roller mill again for 24 hours. Similar samples were prepared with different amounts of superphosphoric acid and calcium carbonate as shown in Table II. The samples were then subjected to accelerated caking tests. The results of the caking tests are shown in Table III. A sample of regular high density ammonium nitrate coated with 2.8% Dicalite, a commercial diatomaceous earth coating agent, was included as a control.

given screen analysis. The samples were divided and one portion was coated separately with superphosphoric acid and magnesium carbonate and the other portion with phosphorus pentaoxide and magnesium carbonate to form a coating of magnesium phosphate in each case. In all of these tests a total coating agent level of 2.5% by weight was used. Comparison of the results of caking tests on the coated samples indicates that results similar to Examples V–VIII were obtained. Tests on all of the samples showed these to invariably be better than standard high density ammonium nitrate (see Table III) with respect to cake strength formed in the accelerated caking test.

Samples of the coated materials were also subjected to bridging tests in which some of the blends were heated to 135° F. in an oven and bridging tests run on the warm samples. Bridging tests were also run on samples at room temperature. Controls with regular high density ammonium nitrate coated with 2.8% Dicalite, both warm and at room temperature, were also run. The samples were aged for one week at room temperature and checked again in the bridging equipment. It required more pressure to bridge hot magnesium phosphate coated ammonium nitrate than it did to bridge cooled Dicalite coated ammonium nitrate. In the bridging test, the greater the pressure than is required to bridge the material together, the better the flowability of the material.

EXAMPLE X

A coating of calcium sulfate is applied to ammonium nitrate granules by the process of Examples V–VIII with oleum being substituted for the superphosphoric acid.

EXAMPLE XI

A coating of potassium sulfate is applied according to the process of Examples V–VIII using potassium carbonate in place of the calcium carbonate.

EXAMPLE XII

Ammonium nitrate fertilizer granules are coated with ammonium sulfate by (A) being passed through an atmosphere containing sulfur trioxide and water vapor (from heated AN) to deposit a thin continuous coating of sulfuric acid on each granule and then immediately (B) being passed through a zone carrying ammonia vapors to neutralize the sulfuric acid and form a continuous coating of ammonium sulfate.

EXAMPLE XIII

Ammonium nitrate granules are coated with calcium sulfate by following the procedure of step (A) in Example XII, to coat the granules with sulfuric acid and thereafter, dusting the granules with calcium carbonate.

EXAMPLE XIV

A coating of ammonium sulfate is applied to ammonium nitrate granules by reversing steps (A) and (B) of Example XII to first form a thin coating of a slightly aqueous solution of ammonia over the entire surface of each granule, which solution is then immediately reacted with sulfur trioxide.

EXAMPLE XV

The coating applied to the ammonium nitrate granules of Example VI is exposed, while hot, briefly to ammonium vapors and a second coating of ammonium sulfate applied by reaction with sulfur trioxide vapors according to step (A) of Example XII to provide an impervious two-layer coating on each granule.

EXAMPLE XVI

The calcium sulfate coated ammonium nitrate granules of Example X are additionally coated with calcium phosphate according to Examples V–VIII to give a more continuous coating.

EXAMPLE XVII

A controlled variable release fertilizer is formed by combining 1 part each of ammonium nitrate granules coated with 2% ammonium phosphate, 10% ammonium phosphate and 10% ammonium sulfate which dissolve rapidly and 2 parts each of ammonium nitrate coated with, respectively, 10% calcium sulfate and 20% calcium sulfate.

While the invention has been described in connection with the above embodiments, it is to be understood that this description and the examples are illustrative only, do not limit the invention and various modifications within the spirit and scope of this invention will be apparent to one skilled in the art. For instance, it is applicable to prilled fertilizers as well as granulated fertilizers.

It is claimed:

1. A method for the production of water resistant-coated, solid, discrete fertilizer particles which consists essentially of separately coating the fertilizer particles with an acidic inorganic material having desiccating properties and selected from the group consisting of superphosphoric acid, $SO_3$, oleum and mixtures thereof and an alkaline inorganic material selected from the group consisting of calcium oxide, calcium carbonate, magnesium oxide, magnesium carbonate and mixtures thereof to produce the desired inorganic salt in situ on the particles, with the proviso that neither the acidic inorganic material nor the basic inorganic material react appreciably with the fertilizer.

2. The method of claim 1 wherein said fertilizer is coated with said salt in an amount of from about 0.75 to 25% by weight of said salt based upon the fertilizer material.

3. The method of claim 1 wherein said fertilizer material is ammonium nitrate.

4. The method of claim 1 wherein said inorganic alkaline material is selected from the group consisting of magnesium oxide and magnesium carbonate.

5. The method of claim 1 wherein said inorganic alkaline material is selected from the group consisting of calcium oxide and calcium carbonate.

6. A method for coating discrete fertilizer particles which comprises coating said particles with an inorganic sulfate formed in situ on the granules by first passing said particles through an atmosphere containing sulfur trioxide to deposit a thin continuous coating of sulfuric acid around each particle and then neutralizing said acid by passing said particles through a zone containing calcium carbonate to form said coating of an inorganic sulfate.

7. A method for the production of an anti-caking fertilizer consisting essentially of solid discrete fertilizer particles coated with a relatively water-insoluble inorganic sulfate, which method consists essentially of separately coating the fertilizer particles with an inorganic acidic material selected from the group consisting of $SO_3$ and oleum and an alkaline inorganic material selected from the group consisting of calcium oxide, calcium carbonate, magnesium oxide, magnesium carbonate and mixtures thereof to produce the desired inorganic sulfate in situ on the particles.

8. A method for the production of an anti-caking fertilizer consisting essentially of solid discrete fertilizer particles coated with a relatively water-insoluble organic phosphate, which method consists essentially of separately coating the fertilizer particles with superphosphoric acid and an alkaline inorganic material selected from the group consisting of calcium oxide, calcium carbonate, magnesium oxide, magnesium carbonate and mixtures thereof to produce the desired inorganic phosphate in situ on the particles.

9. An anticaking fertilizer comprising a mass of discrete fertilizer particles, the particles being coated with an anticaking agent selected from the group consisting of the relatively water-insoluble magnesium phosphates and relately water-insoluble calcium phosphates and mixtures thereof in an amount sufficient to prevent caking of said particles.

10. The fertilizer of claim 9 wherein at least about 0.75% by weight, referred to the fertilizer material, of said agent is applied to the fertilizer particles.

11. The fertilizer of claim 9 wherein said phosphate is calcium phosphate.

12. The fertilizer of claim 9 wherein said phosphate is magnesium phosphate.

13. The fertilizer of claim 9 wherein said amount is from 1 to 2% by weight based on the fertilizer material.

14. A controlled release fertilizer comprising a mass of discrete fertilizer particles, the particles being coated with from about 5 to 25% by weight based on the fertilizer material of a coating agent selected from the group consisting of the relatively water-insoluble magnesium phosphates and relatively water-insoluble calcium phosphates and mixtures thereof.

References Cited

UNITED STATES PATENTS

| | | | |
|---|---|---|---|
| 1,631,903 | 6/1927 | Van der Lande | 252—385 X |
| 2,600,253 | 6/1952 | Lutz | 71—43 X |
| 2,965,471 | 12/1960 | Stassfort | 71—43 X |
| 3,070,435 | 12/1962 | Keusser et al. | 252—385 |
| 3,149,956 | 9/1964 | Seymour et al. | 71—64 X |
| 3,240,586 | 3/1966 | Harris | 71—64 X |
| 3,291,595 | 12/1966 | Kearns | 71—64 X |

S. LEON BASHORE, *Acting Primary Examiner.*

R. BAJEFSKY, *Assistant Examiner.*

U.S. Cl. X.R.

71—58, 64; 117—100; 252—381, 385